US 11,919,593 B2

(12) United States Patent
Mayuzumi et al.

(10) Patent No.: US 11,919,593 B2
(45) Date of Patent: Mar. 5, 2024

(54) SADDLE-RIDE TYPE VEHICLE

(71) Applicant: HONDA MOTOR CO., LTD., Tokyo (JP)

(72) Inventors: Kei Mayuzumi, Tokyo (JP); Keita Mikura, Tokyo (JP); Masaomi Yamada, Tokyo (JP); Kunihiro Notsu, Tokyo (JP); Masayuki Hiramaru, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/800,264

(22) PCT Filed: Dec. 23, 2020

(86) PCT No.: PCT/JP2020/048284
§ 371 (c)(1),
(2) Date: Aug. 17, 2022

(87) PCT Pub. No.: WO2021/166438
PCT Pub. Date: Aug. 26, 2021

(65) Prior Publication Data
US 2023/0084197 A1 Mar. 16, 2023

(30) Foreign Application Priority Data
Feb. 21, 2020 (JP) .................................. 2020-028110

(51) Int. Cl.
*B62J 13/02* (2006.01)
*B62M 9/00* (2006.01)
(52) U.S. Cl.
CPC ........ *B62J 13/02* (2013.01); *B62M 2009/007* (2013.01)

(58) Field of Classification Search
CPC .. B62J 13/00; B62J 13/04; B62J 13/02; F16H 57/031; F16H 57/035; B62K 19/44
(Continued)

(56) References Cited

U.S. PATENT DOCUMENTS 582,096 A * 5/1897 Rominger ................ B62J 13/02
474/144
1,400,131 A * 12/1921 Adams ..................... B62J 13/02
D12/127

(Continued)

FOREIGN PATENT DOCUMENTS

EP        2 487 096 A2    8/2012
JP        S55-2771        1/1980

(Continued)

OTHER PUBLICATIONS

English translation of International Preliminary Report on Patentability dated Aug. 25, 2022; Application No. PCT/JP2020/048284, (4 pages).

(Continued)

Primary Examiner — Henry Y Liu
(74) Attorney, Agent, or Firm — Rankin, Hill & Clark LLP

(57) ABSTRACT

A cover member configured to cover a drive-power transmission member is fixed to a swing arm with a simple structure. A saddle-ride type vehicle includes a swing arm swingable up and down, a rear wheel supported at a rear end portion of the swing arm, an endless drive-power transmission member extending along the swing arm in a front-rear direction and configured to transmit drive power of a power unit to the rear wheel, a cover member fixed to the swing arm and covering the drive-power transmission member, and a slider provided on an upper face of the swing arm and configured to receive the drive-power transmission member. The cover member includes a fastening portion that is (Continued)

fastened to the swing arm by a fastener and an engagement portion that engages with the slider.

9 Claims, 5 Drawing Sheets

(58) Field of Classification Search
USPC ......................................................... 474/144
See application file for complete search history.

(56) References Cited

U.S. PATENT DOCUMENTS

| | | | | |
|---|---|---|---|---|
| 1,636,327 | A * | 7/1927 | Roe .......................... | B62J 13/00 474/144 |
| 3,724,582 | A * | 4/1973 | Wood ........................ | B62J 13/04 180/219 |
| RE28,335 | E * | 2/1975 | Wood ........................ | B62J 13/04 180/219 |
| 4,240,303 | A * | 12/1980 | Mosley ..................... | F16H 57/04 474/151 |
| 4,366,880 | A * | 1/1983 | Miller ....................... | B62J 13/00 180/219 |
| 4,471,851 | A * | 9/1984 | Kamiya ................... | B62J 13/00 180/219 |
| 4,639,240 | A * | 1/1987 | Liu ........................... | B62J 13/00 474/144 |
| 4,699,539 | A * | 10/1987 | Chen ......................... | B62J 13/00 411/549 |
| 4,723,619 | A * | 2/1988 | Yamamoto ................ | F01P 1/06 74/606 R |
| 4,733,741 | A * | 3/1988 | Swanson .................. | B62J 13/00 180/219 |
| 4,754,833 | A * | 7/1988 | Kawashima ......... | B62K 25/283 474/93 |
| 4,815,555 | A * | 3/1989 | Kishi ....................... | B62J 15/00 180/219 |
| 4,993,508 | A * | 2/1991 | Nozoe .................. | B62K 25/005 180/219 |
| 5,067,930 | A * | 11/1991 | Morales ................... | B62J 13/00 474/144 |
| 5,312,303 | A * | 5/1994 | Hinschlager ............. | B62J 13/04 474/146 |
| 5,445,568 | A * | 8/1995 | Fukuzawa ................ | B62J 13/00 474/144 |
| 5,580,325 | A * | 12/1996 | Hirota .................... | F02B 77/081 474/144 |
| 6,267,700 | B1 * | 7/2001 | Takayama ........... | F16H 57/0489 474/93 |
| 6,332,853 | B1 * | 12/2001 | Bowman .................. | B62J 23/00 474/146 |
| 6,338,688 | B1 * | 1/2002 | Minami ................ | F16H 57/035 474/146 |
| 7,066,856 | B1 * | 6/2006 | Rogers ..................... | B62J 23/00 474/144 |
| 7,544,154 | B2 * | 6/2009 | Corbalis ............ | A63B 22/0605 474/144 |
| 7,691,019 | B2 * | 4/2010 | Gogo ....................... | B62J 13/00 474/140 |
| 7,771,303 | B2 * | 8/2010 | Fuse ......................... | F16H 7/18 474/140 |
| 7,849,948 | B2 * | 12/2010 | Clarkson .................. | B62J 15/00 280/852 |
| 7,874,951 | B2 * | 1/2011 | Leiss ....................... | F04B 17/06 474/146 |
| 7,951,031 | B2 * | 5/2011 | Hioki ....................... | B62J 13/04 474/146 |
| 8,038,557 | B2 * | 10/2011 | Aoyama ................... | F16H 9/18 474/144 |
| 8,561,750 | B2 * | 10/2013 | Kakimoto ................ | B62M 9/16 474/140 |
| 8,950,539 | B2 * | 2/2015 | Buell ....................... | B62K 11/04 180/220 |
| 8,961,342 | B2 * | 2/2015 | Emura ................... | B62M 9/136 474/140 |
| 10,071,784 | B2 * | 9/2018 | Callahan .................. | B62K 3/06 |
| 2002/0160869 | A1 * | 10/2002 | Barnett .................. | B62M 9/138 474/144 |
| 2003/0224891 | A1 * | 12/2003 | Chou ....................... | B62M 9/16 474/146 |
| 2005/0159260 | A1 * | 7/2005 | Gogo ....................... | B62J 13/00 474/140 |
| 2005/0282670 | A1 * | 12/2005 | Kim ......................... | B62J 13/04 474/144 |
| 2006/0172838 | A1 * | 8/2006 | DaSantos ................. | B62J 13/00 474/144 |
| 2007/0032324 | A1 * | 2/2007 | Uchiyama ................ | B62M 9/16 474/140 |
| 2007/0087877 | A1 * | 4/2007 | McGarry ................. | B62J 13/00 474/144 |
| 2007/0152423 | A1 * | 7/2007 | Waters ..................... | B62J 13/00 280/304.3 |
| 2007/0265121 | A1 * | 11/2007 | Gross ....................... | B62J 13/00 474/144 |
| 2008/0139355 | A1 * | 6/2008 | Hioki ....................... | F16H 7/18 474/140 |
| 2008/0227573 | A1 * | 9/2008 | Strombeck ............... | B62J 13/00 474/144 |
| 2008/0293528 | A1 * | 11/2008 | Paull ....................... | B62J 13/00 474/144 |
| 2009/0197725 | A1 * | 8/2009 | Chuang ................... | B62J 13/02 280/281.1 |
| 2010/0323834 | A1 * | 12/2010 | Grube ....................... | F16H 7/02 474/144 |
| 2011/0251003 | A1 * | 10/2011 | Nishimiya ................ | F16H 7/02 474/144 |
| 2013/0337955 | A1 * | 12/2013 | Ono ......................... | B62J 13/00 474/144 |
| 2014/0051535 | A1 * | 2/2014 | Cranston .................. | B62J 13/00 474/140 |
| 2015/0024890 | A1 * | 1/2015 | Eberhardt ............. | F16H 57/031 474/144 |
| 2015/0259030 | A1 * | 9/2015 | Nakano .................... | F16H 7/18 474/144 |

FOREIGN PATENT DOCUMENTS

| | | |
|---|---|---|
| JP | S56-73987 | 6/1981 |
| JP | S61-142691 | 9/1986 |
| JP | H05-8776 | 1/1993 |
| JP | H08-99663 | 4/1996 |
| JP | 2016-147564 A | 8/2016 |
| JP | 2016-147618 | 8/2016 |

OTHER PUBLICATIONS

International Search Report, International Application No. PCT/JP2020/048284, dated Feb. 16, 2021, 3 pages.

International Preliminary Report on Patentability (IPEA 409), International Application No. PCT/JP2020/048284, 8 pages.

Indian Office Action dated Sep. 26, 2022 issued in corresponding Indian application No. 202247052656; English translation included (5 pages).

German Office Action dated Nov. 16, 2023, German Application No. DE 11-2020-006-769.6, English translation included, 15 pages.

* cited by examiner

SADDLE-RIDE TYPE VEHICLE

TECHNICAL FIELD

The present invention relates to saddle-ride type vehicles.

BACKGROUND ART

There has been known a saddle-ride type vehicle including a swing arm, an endless drive-power transmission member extending along the swing arm in the front-rear direction and configured to transmit drive power of a power unit to a rear wheel, a cover member fixed to the swing arm and covering the drive-power transmission member, and a slider provided on an upper face of the swing arm and configured to receive the drive-power transmission member (for example, see Patent Literature 1). In Patent Literature 1, a cover member is fastened to stays provided on a swing arm with screws inserted into the cover member.

CITATION LIST

Patent Literature

[Patent Literature 1]
Japanese Patent Laid-Open No. 2016-147618

SUMMARY OF INVENTION

Technical Problem

However, in the above conventional saddle-ride type vehicle, fixation is made by screws at all the points at which the cover member is fixed to the swing arm, and this increases the part count. In addition, dedicated stays to which the screws are fastened are also necessary, and this increases the part count.

The present invention has been made in light of the above situation, and an object is that a cover member configured to cover a drive-power transmission member can be fixed to a swing arm with a simple structure.

Solution to Problem

This specification includes the entire contents of Japanese Patent Application No. 2020-028110, filed on Feb. 21, 2020.

A saddle-ride type vehicle includes: a swing arm (13) swingable up and down; a rear wheel (3) supported at a rear end portion of the swing arm (13); an endless drive-power transmission member (39) extending along the swing arm (13) in a front-rear direction and configured to transmit drive power of a power unit (11) to the rear wheel (3); a cover member (40) fixed to the swing arm (13) and covering the drive-power transmission member (39); and a slider (60) provided on an upper face of the swing arm (13) and configured to receive the drive-power transmission member (39), wherein the cover member (40) includes a fastening portion (76a, 76b) that is fastened to the swing arm (13) by a fastener (79) and an engagement portion (80) that engages with the slider (60).

In the above configuration, the engagement portion (80) may engage with the slider (60) at a position on an inside of the drive-power transmission member (39) in a vehicle width direction.

In the above configuration, the slider (60) may include a tubular portion (68) extending upward from the upper face of the swing arm (13) and may be fastened to the swing arm (13) by a slider fastener (70) inserted into the tubular portion (68) from above, and the engagement portion (80) may engage with an outer peripheral portion of the tubular portion (68).

In the above configuration, the slider (60) may include a slider body portion (61) configured to receive the drive-power transmission member (39) and an inner extension portion (62) extending to a position on an inside of the drive-power transmission member (39) in a vehicle width direction, and the tubular portion (68) may be provided at the inner extension portion (62).

In the above configuration, the swing arm (13) may include a pair of right and left arm portions (51, 52) and a cross member (53) connecting the right and left arm portions (51, 52) in a vehicle width direction, the slider (60) may extend along an upper face of one of the arm portions (51) in a vehicle front-rear direction, and the tubular portion (68) may be fixed to an upper face of the cross member (53).

In the above configuration, the engagement portion (80) may be a cut-in portion having an approximately U-like shape open in a front direction in top view, and an inner peripheral portion of the cut-in portion may engage with a groove portion (68b) of the outer peripheral portion of the tubular portion (68) from behind.

In the above configuration, the cover member (40) may include an outer wall portion (76) that covers the drive-power transmission member (39) from an outside in a vehicle width direction, an inner wall portion (77) that covers the drive-power transmission member (39) from an inside in the vehicle width direction, and an extension portion (78) extending inward in the vehicle width direction from the inner wall portion (77), and the engagement portion (80) may be provided in the extension portion (78).

In the above configuration, the engagement portion (80) may be provided at a front end portion of the cover member (40), and the engagement portion (80) may be inserted into the slider (60) from behind.

In addition, at least one of a plurality of the fastening portions (76a, 76b) and the engagement portion (80) may be disposed to be aligned in a vehicle width direction at a front end portion of the cover member (40).

In the above configuration, the slider (60) with which the engagement portion (80) engages may be made of an elastomer, and the engagement portion (80) may be elastically supported by the slider (60).

Advantageous Effects of Invention

A saddle-ride type vehicle includes: a swing arm swingable up and down; a rear wheel supported at a rear end portion of the swing arm; an endless drive-power transmission member extending along the swing arm in a front-rear direction and configured to transmit drive power of a power unit to the rear wheel; a cover member fixed to the swing arm and covering the drive-power transmission member; and a slider provided on an upper face of the swing arm and configured to receive the drive-power transmission member, wherein the cover member includes a fastening portion that is fastened to the swing arm by a fastener and an engagement portion that engages with the slider.

With this configuration, since for the cover member, the fastening portion is fastened to the swing arm by the fastener, and the engagement portion engages with the slider, it is possible to fix the cover member without using a fastening member at the engagement portion. Thus, it is possible to reduce the part count. In addition, since the engagement portion engages with the slider, the slider can be utilized to fix the engagement portion. Thus, it is possible to fix the cover member to the swing arm with a simple structure.

In the above configuration, the engagement portion may engage with the slider at a position on an inside of the drive-power transmission member in a vehicle width direction.

With this configuration, since the engagement portion engages with the slider at a position on the inside of the drive-power transmission member in the vehicle width direction, it is easy to fix the cover member to the slider. For example, in a case in which fastening work is performed at a deep position on the inside of the drive-power transmission member in the vehicle width direction, the work space is small, and the fastening work needs a lot of efforts.

In the above configuration, the slider may include a tubular portion extending upward from the upper face of the swing arm and may be fastened to the swing arm by a slider fastener inserted into the tubular portion from above, and the engagement portion may engage with an outer peripheral portion of the tubular portion.

With this configuration, since the engagement portion engages with the outer peripheral portion of the tubular portion extending upward from the upper face of the swing arm, it is easy to engage the engagement portion. Since the tubular portion is a portion that is fixed to the swing arm with the slider fastener, and it is unlikely to be shaken, it is possible to support the engagement portion favorably.

In the above configuration, the slider may include a slider body portion configured to receive the drive-power transmission member and an inner extension portion extending to a position on an inside of the drive-power transmission member in a vehicle width direction, and the tubular portion may be provided at the inner extension portion.

With this configuration, the tubular portion can be provided at a position away from the drive-power transmission member inward in the vehicle width direction.

In the above configuration, the swing arm may include a pair of right and left arm portions and a cross member connecting the right and left arm portions in a vehicle width direction, the slider may extend along an upper face of one of the arm portions in a vehicle front-rear direction, and the tubular portion may be fixed to an upper face of the cross member.

With this configuration, the upper face of the cross member can be utilized to fix the tubular portion to a position on the inside of the arm portion in the vehicle width direction.

In the above configuration, the engagement portion may be a cut-in portion having an approximately U-like shape open in a front direction in top view, and an inner peripheral portion of the cut-in portion may engage with a groove portion of the outer peripheral portion of the tubular portion from behind.

With this configuration, it is possible to engage the engagement portion easily by inserting the engagement portion into the groove portion of the tubular portion from behind. In addition, the position of the engagement portion can be restricted in the front-rear direction, in the right-left direction, and in the up-down direction with a simple structure.

In the above configuration, the cover member may include an outer wall portion that covers the drive-power transmission member from an outside in a vehicle width direction, an inner wall portion that covers the drive-power transmission member from an inside in the vehicle width direction, and an extension portion extending inward in the vehicle width direction from the inner wall portion, and the engagement portion may be provided in the extension portion.

With this configuration, since the engagement portion can be separated from the drive-power transmission member by the inner wall portion, it is possible to prevent or reduce contamination of the engagement portion due to the drive-power transmission member and thus possible to engage the engagement portion appropriately. In addition, the engagement portion can be hidden by the inner wall portion so that the outer appearance can be made to look simple, and thus the outer appearance looks favorable.

In the above configuration, the engagement portion may be provided at a front end portion of the cover member, and the engagement portion may be inserted into the slider from behind.

With this configuration, it is possible to engage the engagement portion with the slider easily from behind.

In the above configuration, at least one of a plurality of the fastening portions and the engagement portion may be disposed to be aligned in a vehicle width direction at a front end portion of the cover member.

With this configuration, since the fastening portion and the engagement portion are located to be aligned in the vehicle width direction, a positional deviation of the engagement portion can be prevented or reduced by fastening, and the engagement portion can be kept appropriately engaged with the slider.

In the above configuration, the slider with which the engagement portion engages may be made of an elastomer, and the engagement portion may be elastically supported by the slider.

With this configuration, since the cover member is supported by utilizing the slider made of an elastomer, it is possible to reduce vibration of the cover member.

DESCRIPTION OF EMBODIMENT

Hereinafter, an embodiment of the present invention will be described with reference to the drawings. Note that the directions mentioned in the description such as front-rear, right-left, and upper-lower are the same as the directions with respect to the vehicle body, unless otherwise specified. In each drawing, the symbol FR indicates the front direction relative to the vehicle body, the symbol UP indicates the upward direction relative to the vehicle body, and the symbol LH indicates the left direction relative to the vehicle body.

Figure 1:
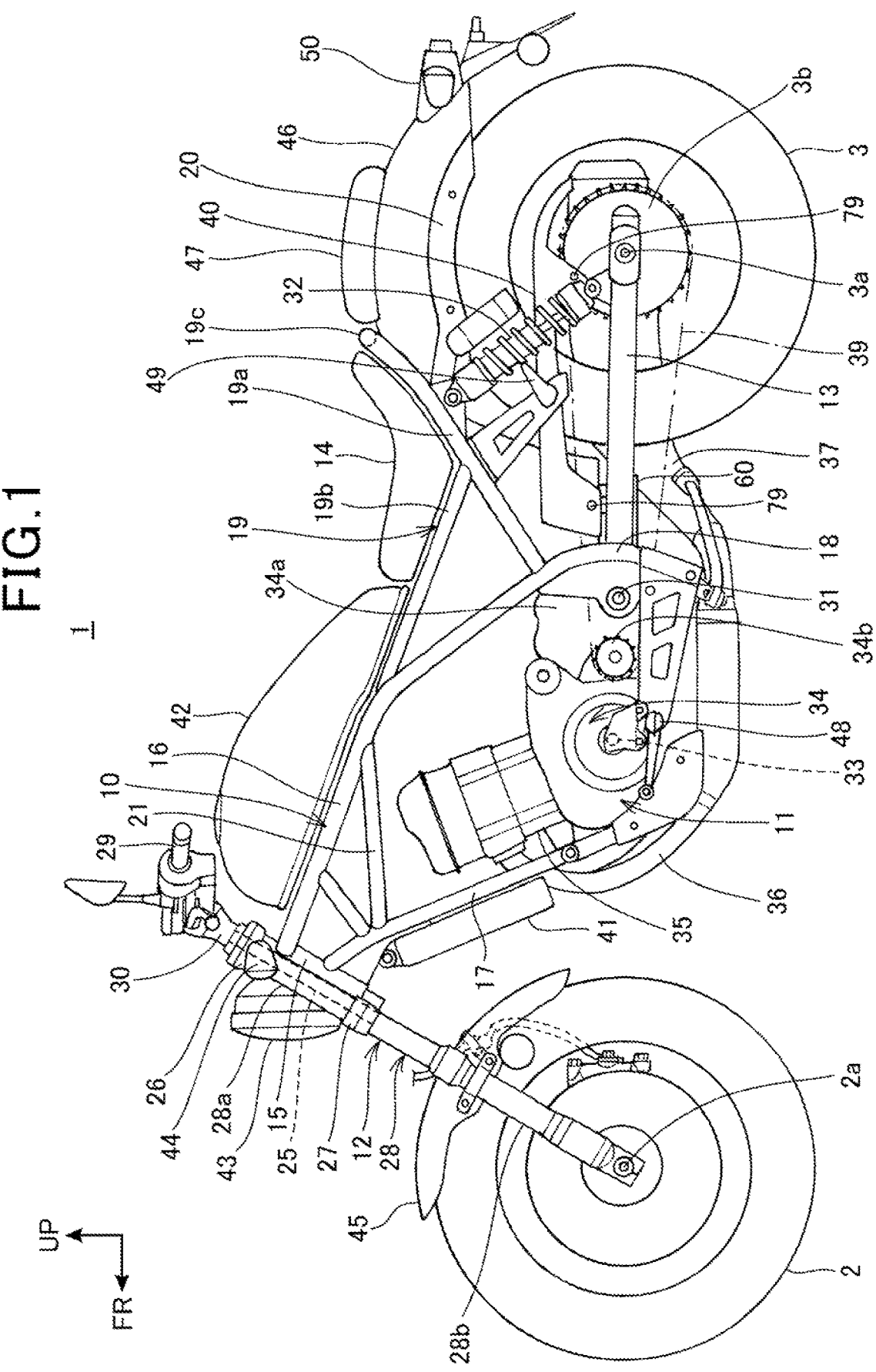
FIG. 1 is a left side view of a motorcycle according to an embodiment of the present invention.

FIG. 1 is a left side view of a motorcycle 1 according to the embodiment of the present invention.

The motorcycle 1 is a vehicle in which an engine 11 serving as a power unit is supported by a vehicle body frame 10, a front fork 12 that steerably supports a front wheel 2 is steerably supported by the front end of the vehicle body frame 10, and a swing arm 13 supporting a rear wheel 3 is provided at the rear side of the vehicle body frame 10.

The motorcycle 1 is a saddle-ride type vehicle which the occupant (driver) sits astride, sitting on a seat 14, and the seat 14 is provided above a rear portion of the vehicle body frame 10.

The vehicle body frame 10 includes a head pipe 15 provided at the front end of the vehicle body frame 10, a pair of right and left main frames 16 extending rearward and downward from the head pipe 15, a pair of right and left down frames 17 extending rearward and downward from a portion of the head pipe 15 on the lower side of the main frames 16, a pair of right and left pivot frames 18 extending downward from the rear end of the main frames 16, a seat frame 19 extending rearward from rear portions of the main frames 16 and upper portions of the pivot frames 18, and a rear frame 20 extending from rear portions of the seat frame 19 to a rear end portion of the motorcycle 1.

In addition, the vehicle body frame 10 includes a pair of right and left reinforcement frames 21 connecting upper portions of the down frames 17 and upper portions of the main frames 16.

Specifically, the seat frame 19 includes a pair of right and left lower seat rails 19a extending rearward and upward from the right and left pivot frames 18, a pair of right and left upper seat rails 19b extending rearward and downward from the rear end portions of the right and left main frames 16 and then connected to intermediate portions in the front-rear direction of the lower seat rails 19a, and a right-left connection portion 19c connecting the rear ends of the right and left lower seat rails 19a in the vehicle width direction (right-left direction).

The rear frame 20 extends rearward from rear portions of the lower seat rails 19a.

The front fork 12 includes a steering shaft 25 rotatably supported by the head pipe 15, a top bridge 26 fixed at the upper end of the steering shaft 25, a bottom bridge 27 fixed at the lower end of the steering shaft 25, and a pair of right and left fork tubes 28 supported by the top bridge 26 and the bottom bridge 27.

The fork tubes 28 are telescopic suspensions. The fork tubes 28 include fixed tubes 28a fixed to the top bridge 26 and the bottom bridge 27 and movable tubes 28b fitted into the lower portions of the respective fixed tubes 28a and capable of axially reciprocating relative to the fixed tubes 28a.

The top bridge 26 extends from the steering shaft 25 in the vehicle width direction above the head pipe 15 and connects upper end portions of the right and left fixed tubes 28a.

The bottom bridge 27 extends from the steering shaft 25 in the vehicle width direction below the head pipe 15 and connects the right and left fixed tubes 28a.

The fork tubes 28 are disposed so as to be inclined rearward in vehicle side view. The front wheel 2 is rotatably supported by an axle 2a disposed between lower end portions of the right and left movable tubes 28b and is located between the right and left movable tubes 28b.

The handle 29 for the occupant to steer the front fork 12 to the right and left is attached to the top bridge 26 via a handle post 30.

The swing arm 13 is pivotally supported by a pivot shaft 31 supported by the right and left pivot frames 18. The pivot shaft 31 extends horizontally in the vehicle width direction. A front end portion of the swing arm 13 is pivotally supported by the pivot shaft 31 and swings up and down around the pivot shaft 31.

The rear wheel 3 is rotatably supported by an axle 3a provided at a rear end portion of the swing arm 13.

The motorcycle 1 includes a pair of right and left rear suspensions 32 disposed between rear end portions of the swing arm 13 and the seat frame 19.

The engine 11 is disposed below the main frames 16 and between the down frames 17 and the pivot frames 18 in the vehicle front-rear direction and fixed to the vehicle body frame 10.

The engine 11 includes a crank case 34 supporting a crank shaft 33 extending horizontally in the vehicle width direction (right-left direction) and a cylinder portion 35 storing a piston (not illustrated) that reciprocates. The cylinder portion 35 extends upward from the upper face of a front portion of the crank case 34.

An exhaust device of the engine 11 includes an exhaust pipe 36 connected to an exhaust port in the front face of the cylinder portion 35 and a muffler 37 connected to the downstream end of the exhaust pipe 36.

The rear portion of the crank case 34 is a transmission case portion 34a storing a transmission. An output shaft (not illustrated) of the transmission protrudes outward in the vehicle width direction from the transmission case portion 34a, and the output shaft is provided with a drive sprocket 34b.

The output of the engine 11 is transmitted to the rear wheel 3 through a drive-power transmission member 39 connecting the drive sprocket 34b and a driven sprocket 3b of the rear wheel 3. In this case, the drive-power transmission member 39 is an endless chain disposed between the drive sprocket 34b and the driven sprocket 3b so as to be wound on them, but the drive-power transmission member 39 may be, for example, an endless belt.

A cover member 40 covering the drive-power transmission member 39 is attached to the swing arm 13.

A radiator 41 through which cooling water for the engine 11 passes is disposed below the head pipe 15 and on the front side of the engine 11.

A fuel tank 42 is disposed above the main frames 16 and between the head pipe 15 and the seat 14.

A head light 43 is provided on the front side of the head pipe 15. Turn signals 44 are attached to upper portion of the fork tubes 28.

The front fender 45 which covers the front wheel 2 from above is supported by the fork tube 28.

A rear fender 46 that covers the rear wheel 3 from above is supported by the rear frame 20. The rear fender 46 is disposed on the rear side of the seat 14.

The motorcycle 1 includes a rear seat 47 on which a passenger sits, on the rear side of the seat 14. The rear seat 47 is disposed above the rear fender 46.

A pair of right and left steps 48 on which the occupant sitting on the seat 14 puts his/her feet are disposed on the front side of the right and left pivot frames 18. Pillion steps 49 on which the passenger sitting on the rear seat 47 puts his/her feet are disposed on the front lower side of the rear seat 47.

A tail-light unit 50 is attached to a rear end portion of the rear fender 46.

Figure 2:
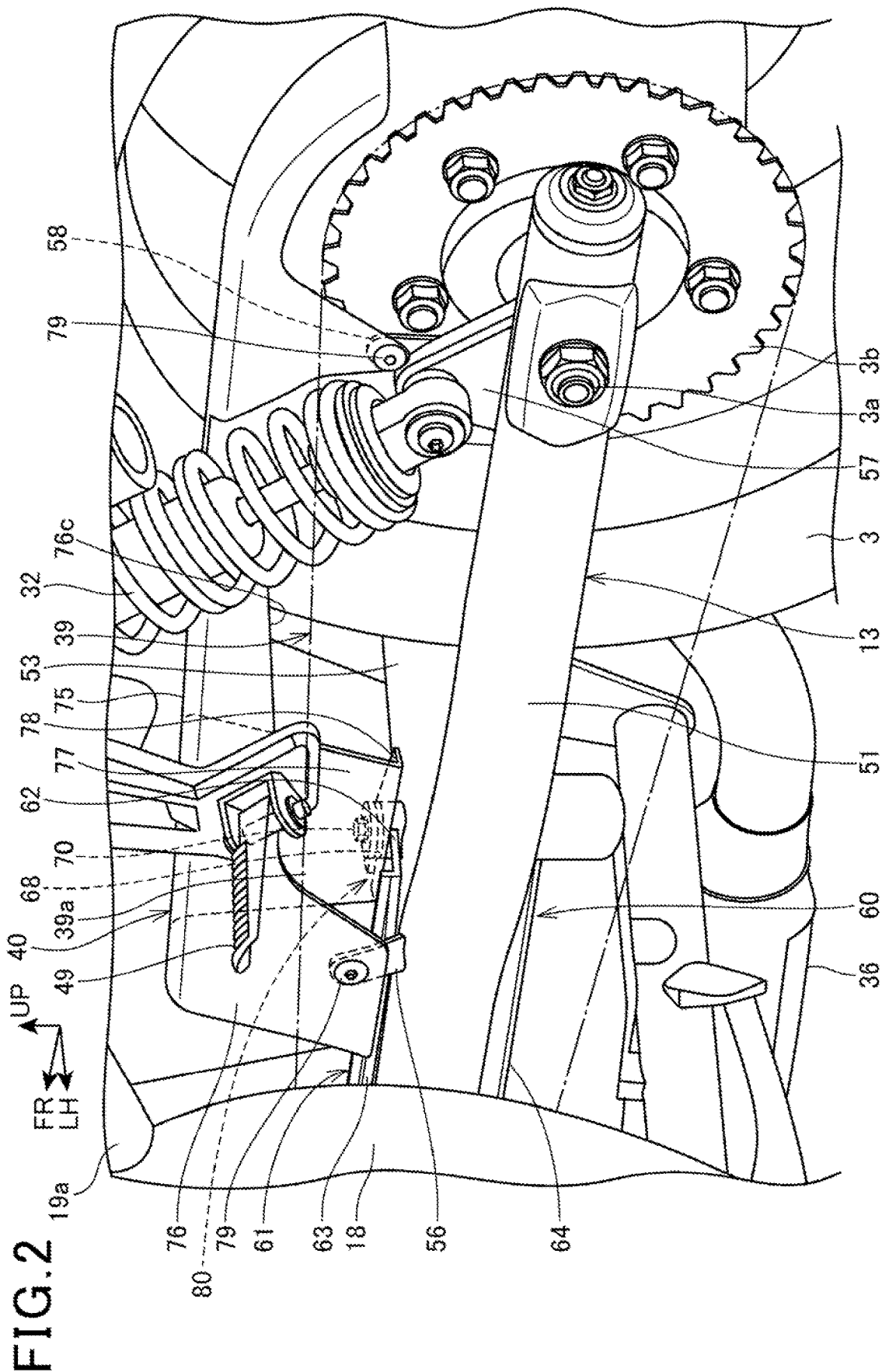
FIG. 2 is a perspective view of the structure of a swing arm and its surroundings, seen from the left side.
Figure 3:
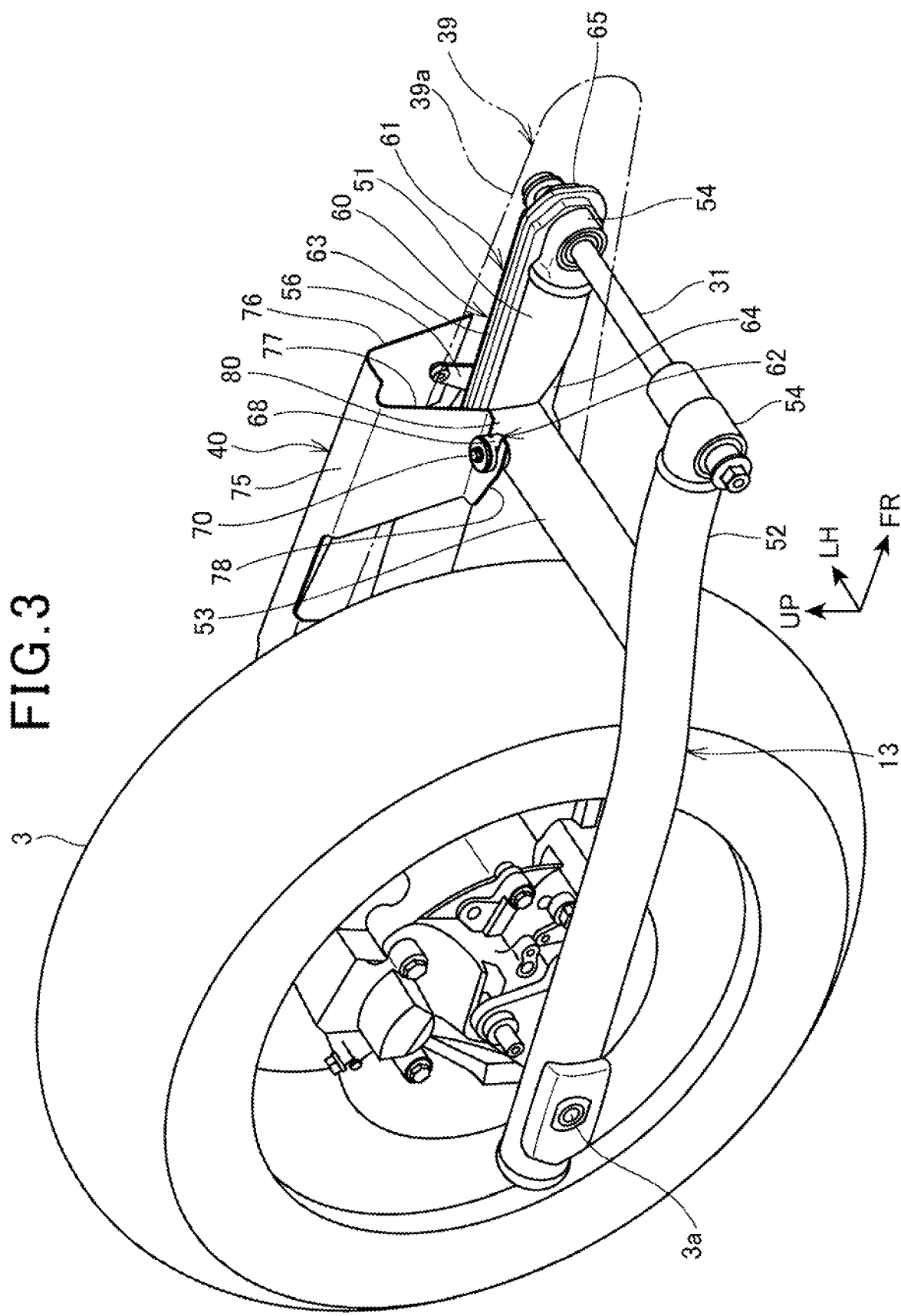
FIG. 3 is a perspective view of the structure of the swing arm and its surroundings, seen from the right side.

FIG. 2 is a perspective view of the structure of the swing arm 13 and its surroundings, seen from the left side. FIG. 3 is a perspective view of the structure of the swing arm 13 and its surroundings, seen from the right side.

With reference to FIGS. 1 to 3, the swing arm 13 includes a pair of arm portions 51 and 52 respectively located on the right and left sides of the rear wheel 3 and a cross member 53 connecting the right and left arm portions 51 and 52 in the vehicle width direction (the right-left direction).

The left arm portion 51 (one of the right and left arm portions) and the right arm portion 52 (the other of the right and left arm portions) have pipe shapes extending in the vehicle front-rear direction. The front end portions of the arm portions 51 and 52 have tubular connecting portions 54 into which a pivot shaft 31 is inserted.

The arm portions 51 and 52 are supported by the pivot shaft 31 via the connecting portions 54. The arm portions 51 and 52 extend from the pivot shaft 31 side and pass through between the right and left pivot frames 18 to the right and left sides of the rear wheel 3.

The rear wheel 3 is disposed between the arm portions 51 and 52 and supported by the axle 3a connecting rear end portions of the arm portions 51 and 52.

The cross member 53 has a pipe shape extending in the vehicle width direction. The cross member 53 connects the arm portions 51 and 52 at a position on the rear side of the pivot shaft 31 and on the front side of the rear wheel 3.

A front stay 56 extending upward is provided on the upper face of a front portion of the arm portion 51. The front stay 56 is located in vehicle side view on the rear side of the pivot frame 18 and on the front side of the rear wheel 3. The front stay 56 is disposed at approximately the same position as the cross member 53 in the vehicle front-rear direction and is located on the outside of the cross member 53 and the drive-power transmission member 39 in the vehicle width direction.

A rear end portion of the arm portion 51 has a suspension connecting portion 57 extending upward. The lower end portion of the rear suspension 32 is connected to the suspension connecting portion 57. The swing arm 13 includes a rear stay 58 extending upward from the suspension connecting portion 57. The rear stay 58 is located on the rear side of the rear suspension 32 and on the upper side of the arm portion 51 and also on the outside of the drive-power transmission member 39 in the vehicle width direction.

The drive-power transmission member 39 extends along the left arm portion 51 in the vehicle front-rear direction and connects the drive sprocket 34b and the driven sprocket 3b. The drive-power transmission member 39 is passed through between the rear suspension 32 and the rear wheel 3.

The drive-power transmission member 39 extends in the vehicle front-rear direction, passing above and below the arm portion 51. The front portion of the drive-power transmission member 39 overlaps with the front portion of the arm portion 51 from above and from below.

A slider 60 configured to receive the drive-power transmission member 39 is attached to the arm portion 51 of the swing arm 13.

Figure 4:
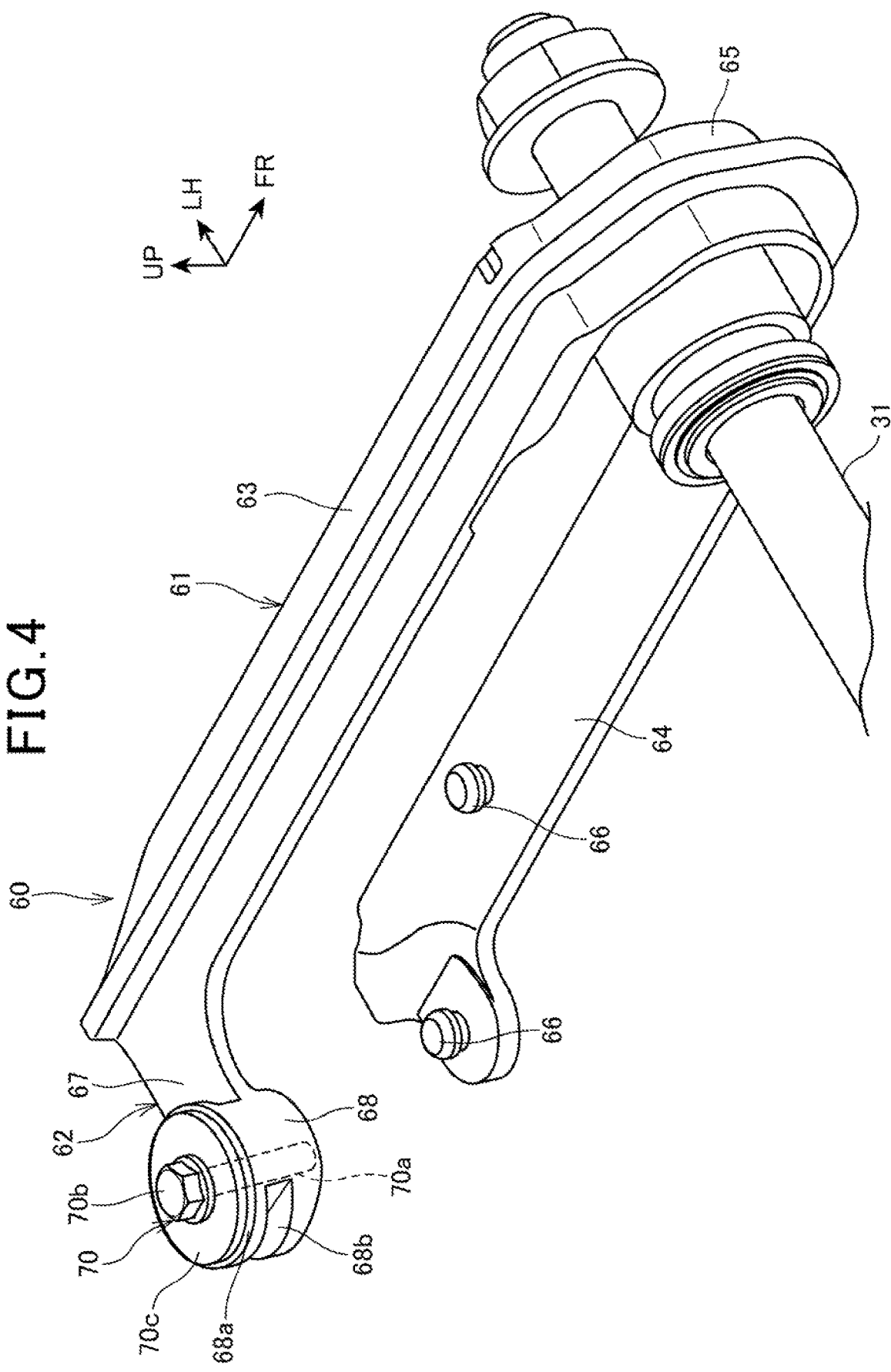
FIG. 4 is a perspective view of a slider, seen from the inside in the vehicle width direction.

FIG. 4 is a perspective view of the slider 60, seen from the inside in the vehicle width direction.

With reference to FIGS. 2 to 4, the slider 60 includes a slider body portion 61 configured to receive the drive-power transmission member 39 and an inner extension portion 62 extending inward in the vehicle width direction from the slider body portion 61.

The slider body portion 61 includes an upper slider portion 63 configured to be attached to the upper face of the arm portion 51, a lower slider portion 64 configured to be attached to the lower face of the arm portion 51, and a connection portion 65 configured to be attached to the front end face of the arm portion 51.

The upper slider portion 63 has a plate shape extending along the upper face of the front portion of the arm portion 51 in the vehicle front-rear direction.

The lower slider portion 64 has a plate shape extending along the lower face of the front portion of the arm portion 51 in the vehicle front-rear direction.

The connection portion 65 connects the front end of the upper slider portion 63 and the front end of the lower slider portion 64 in the upper-lower direction.

When the drive-power transmission member 39 passing above the arm portion 51 is shaken downward, the upper slider portion 63 receives the drive-power transmission member 39 to protect the arm portion 51 against the drive-power transmission member 39.

When the drive-power transmission member 39 passing below the arm portion 51 is shaken upward, the lower slider portion 64 receives the drive-power transmission member 39 to protect the arm portion 51 against the drive-power transmission member 39.

The slider 60 is made of an elastomer to receive the drive-power transmission member 39 gently. The slider 60 is made of, for example, a rubber. The elasticity of the elastomer of which the slider 60 is made is larger than the elasticity of the material of which the arm portion 51 is made (for example, an iron-based material or an aluminum alloy).

The slider 60 includes a plurality of protruding portions 66 protruding upward from the upper face of the lower slider portion 64. The lower slider portion 64 is fixed to the lower face of the swing arm 13 by the protruding portions 66 engaging with the hole portions (not illustrated) formed in the lower face of the swing arm 13.

The inner extension portion 62 of the slider 60 extends inward in the vehicle width direction from a rear end portion of the upper slider portion 63. The inner extension portion 62 extends on the upper face of the cross member 53 in the vehicle width direction and is fixed on the upper face of the cross member 53. The inner extension portion 62 extends to a position on the inside of the drive-power transmission member 39 in the vehicle width direction.

Specifically, the inner extension portion 62 includes a plate-shaped portion 67 extending inward in the vehicle width direction from the upper slider portion 63 and a tubular portion 68 provided at the inner end of the plate-shaped portion 67 in the vehicle width direction.

The tubular portion 68 has a tubular shape extending upward from the upper face of the cross member 53. The tubular portion 68 is fastened to the upper face of the cross member 53 by a slider fastener 70 inserted into the tube of the tubular portion 68 from above. In other words, the slider 60 is fastened to the cross member 53 via the tubular portion 68 by the slider fastener 70.

The upper face 68a of the tubular portion 68 protrudes upward relative to the upper face of the upper slider portion 63 and the upper face of the plate-shaped portion 67.

The outer peripheral portion of the tubular portion 68 has a groove portion 68b having such a shape that part of this outer peripheral portion is removed radially inward. The groove portion 68b is continuous from the right side face to the left side face through the rear face in the outer peripheral portion of the tubular portion 68.

The slider fastener 70 is a bolt. The slider fastener 70 integrally includes a threaded portion 70a that is inserted into the tubular portion 68 and fastened to the cross member 53, a head 70b with which a tool for fastening the slider fastener 70 engages, and a flange portion 70c having a larger diameter than the head 70b.

The flange portion 70c has a disk shape having a larger diameter than the head 70b and has approximately the same diameter as the upper face 68a of the tubular portion 68. The flange portion 70c presses the upper face 68a of the tubular portion 68 from above.

Figure 5:
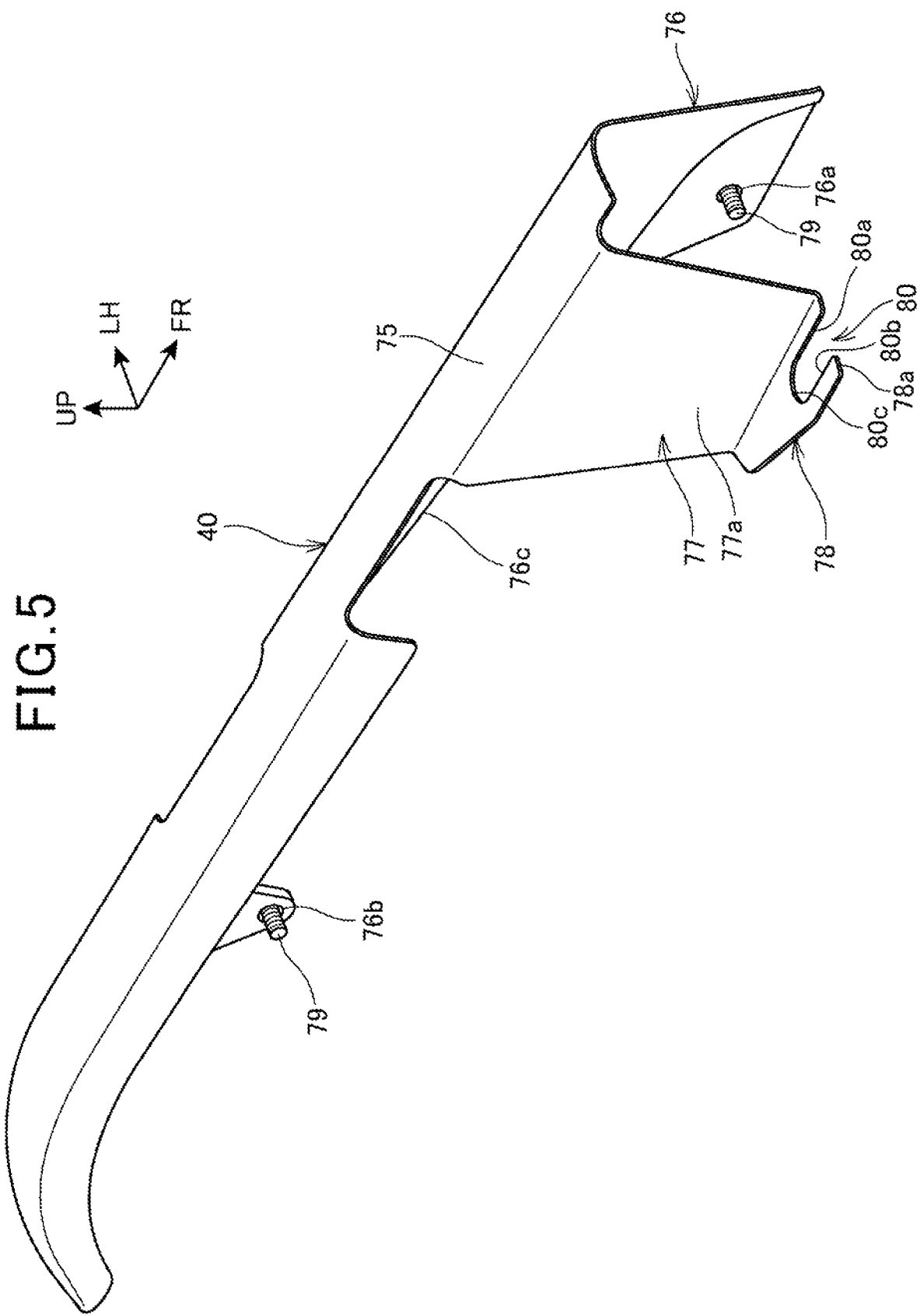
FIG. 5 is a perspective view of a cover member, seen from the inside in the vehicle width direction.

FIG. 5 is a perspective view of the cover member 40, seen from the inside in the vehicle width direction.

With reference to FIGS. 2, 3, and 5, the cover member 40 covers the upper portion 39a of the drive-power transmission member 39 that passes through above the arm portion 51 in the front-rear direction. The cover member 40 is provided on the rear side of the pivot frame 18, and in terms of the up-down direction, it is located between the lower seat rail 19a and the arm portion 51. The cover member 40 is disposed between the rear suspension 32 and the rear wheel 3.

The cover member 40 includes an upper wall portion 75 that covers the upper portion 39a of the drive-power transmission member 39 from above, an outer wall portion 76 extending downward from the outside edge of the upper wall portion 75 in the vehicle width direction, an inner wall portion 77 extending downward from the inside edge of the upper wall portion 75 in the vehicle width direction, and an extension portion 78 extending inward in the vehicle width direction from the lower end of the inner wall portion 77.

The upper wall portion 75 of the cover member 40 is a long plate shape portion extending in the front-rear direction along the upper face of the upper portion 39a of the drive-power transmission member 39 and continuously covers the drive-power transmission member 39 from the front portion to the rear end.

The outer wall portion 76 of the cover member 40 is a plate-shaped portion that covers the upper portion 39a of the drive-power transmission member 39 from the outside in the vehicle width direction.

A lower end portion of the front end portion of the outer wall portion 76 has a front fastening portion 76a (fastening portion) that is fastened to a front portion of the swing arm 13. A lower end portion of a rear end portion of the outer wall portion 76 has a rear fastening portion 76b (fastening portion) that is fastened to a rear portion of the swing arm 13.

The front fastening portion 76a and the rear fastening portion 76b are hole portions through which fasteners 79 for fixing the cover member 40 to the swing arm 13 are inserted. The front fastening portion 76a and the rear fastening portion 76b are located on the outside of the drive-power transmission member 39 in the vehicle width direction.

The outer wall portion 76 has an opening portion 76c between the front fastening portion 76a and the rear fastening portion 76b for exposing the upper portion 39a of the drive-power transmission member 39 to the outside in the vehicle width direction.

The front portion of the cover member 40 is fastened to the outside face of the front stay 56 of the arm portion 51 by a fastener 79 inserted into the front fastening portion 76a from the outside in the vehicle width direction.

The rear portion of the cover member 40 is fastened to the outside face of the rear stay 58 of the arm portion 51 by a fastener 79 inserted into the rear fastening portion 76b from the outside in the vehicle width direction.

The inner wall portion 77 is a plate-shaped portion that covers the upper portion 39a of the drive-power transmission member 39 from the inside in the vehicle width direction.

A front end portion 77a of the inner wall portion 77, in vehicle side view, is located on the front side of the rear wheel 3 and overlaps with the front end portion of the outer wall portion 76 from the inside in the vehicle width direction.

In the inner wall portion 77, the portion on the rear side of the front end portion 77a is located higher than the upper portion 39a of the drive-power transmission member 39 and exposes the upper portion 39a to the inside in the vehicle width direction.

The extension portion 78 of the cover member 40 extends inward in the vehicle width direction from the lower end of the front end portion 77a of the inner wall portion 77.

The inner wall portion 77 is attached to the slider 60 via the extension portion 78.

The extension portion 78 is a plate-shaped portion that overlies an end portion of the cross member 53 in the vehicle width direction from above and is approximately parallel to the upper wall portion 75.

The front end portion of the extension portion 78 has an engagement portion 80 that engages with the slider 60 from behind.

The engagement portion 80 is a cut-in portion having such a shape that the extension portion 78 is cut in rearward from the front edge 78a of the extension portion 78.

The engagement portion 80 is a cut-in portion having an approximately U-like shape open to the front in top view. The inner peripheral portion of the engagement portion has an approximately U-like shape composed of a pair of right and left side edge portions 80a and 80b extending rearward from the front edge 78a of the extension portion 78 and a rear edge portion 80c connecting the rear ends of the side edge portions 80a and 80b in the vehicle width direction.

The engagement portion 80 is provided at a front end portion of the cover member 40. The engagement portion 80 and the front fastening portion 76a are disposed to be aligned in the vehicle width direction at front end portions of the cover member 40 and at approximately the same position in the vehicle front-rear direction.

The engagement portion 80 of the cover member 40 is inserted into the groove portion 68b of the tubular portion 68 of the slider 60 from behind and engages with the outer peripheral portion of the tubular portion 68. Specifically, the side edge portions 80a and 80b of the engagement portion 80 engage with the right and left side portions of the groove portion 68b, and the rear edge portion 80c of the engagement portion 80 engages with the rear portion of the groove portion 68b.

An example of a procedure of attaching the cover member 40 will be described below.

Before the cover member 40 is attached, the slider 60 is already fixed to the swing arm 13 by the slider fastener 70.

First, the cover member 40 is placed above the arm portion 51 so as to cover the upper portion 39a of the drive-power transmission member 39 from above.

Then, the engagement portion 80 of the cover member 40 is inserted into the groove portion 68b of the tubular portion 68 of the slider 60 from behind. In this state, the cover member 40 is positioned at an approximately correct position by the tubular portion 68. Thus, it is easy to position the front and rear fastening portions 76a and 76b of the cover member 40 at the front stay 56 and the rear stay 58.

After that, the fasteners 79 are inserted into the front and rear fastening portions 76a and 76b of the cover member 40, and the cover member 40 is fastened to the front stay 56 and the rear stay 58 by the fasteners 79. In other words, the cover member 40 is fixed to the swing arm 13 by the engagement portion 80 and the pair of fasteners 79.

The engagement portion 80 is fixed to the slider 60 by being inserted into the tubular portion 68. This configuration makes it possible to reduce the number of fasteners and in turn reduce the part count and the weight compared to the structure in which a portion of the engagement portion 80 is fastened to the vehicle body. Although the engagement portion 80 is located at a deep place on the inside of the drive-power transmission member 39 in the vehicle width direction where it is difficult to use a tool, the engagement portion 80 can be fixed by just inserting it, and hence the fixation is easy.

Since the engagement portion 80 engages with the slider 60 provided for the drive-power transmission member 39, a dedicated part for engaging the engagement portion 80 is not necessary, and it is possible to reduce the part count.

Since the tubular portion 68 of the slider 60, with which the engagement portion 80 engages, is made of an elastomer, the cover member 40 can be elastically supported by the tubular portion 68, and the vibration of the cover member 40 can be reduced.

In addition, since the slider fastener 70 is inserted inside the tube of the tubular portion 68, the slider fastener 70 functions as a core material of the tubular portion 68. Thus, the stiffness of the tubular portion 68 can be high, and it is possible to support the engagement portion 80 appropriately.

Note that as an alternative configuration, the slider fastener 70, in a state in which the engagement portion 80 is engaged with the groove portion 68b of the tubular portion 68, may be further tighten to axially compress the tubular portion 68 via the flange portion 70c and may hold the engagement portion 80 by clamping it in the groove portion 68b.

As has been described above, a motorcycle 1, according to the embodiment to which the present invention is applied, includes: a swing arm 13 swingable up and down; a rear wheel 3 supported at a rear end portion of the swing arm 13; an endless drive-power transmission member 39 extending along the swing arm 13 in a front-rear direction and configured to transmit drive power of an engine 11 to the rear wheel 3; a cover member 40 fixed to the swing arm 13 and covering the drive-power transmission member 39; and a slider 60 provided on an upper face of the swing arm 13 and configured to receive the drive-power transmission member 39, wherein the cover member 40 includes front and rear fastening portions 76a and 76b that are fastened to the swing arm 13 by fasteners 79 and an engagement portion 80 that engages with the slider 60.

With this configuration, since for the cover member 40, the front and rear fastening portions 76a and 76b are fastened to the swing arm 13 by the fastener 79, and the engagement portion 80 engages with the slider 60, it is possible to fix the cover member 40 without using a fastening member at the engagement portion 80. Thus, it is possible to reduce the part count. In addition, since the engagement portion 80 engages with the slider 60, the slider 60 can be utilized to fix the engagement portion 80. Thus, it is possible to fix the cover member 40 to the swing arm 13 with a simple structure.

The engagement portion 80 engages with the slider 60 at a position on an inside of the drive-power transmission member 39 in a vehicle width direction.

With this configuration, since the engagement portion 80 engages with the slider 60 at a position on the inside of the drive-power transmission member 39 in the vehicle width direction, it is easy to fix the cover member 40 to the slider 60. For example, in a case in which fastening work is performed at a deep position on the inside of the drive-power transmission member 39 in the vehicle width direction, the work space is small, and the fastening work needs a lot of efforts.

The slider 60 includes a tubular portion 68 extending upward from the upper face of the swing arm 13 and is fastened to the swing arm 13 by a slider fastener 70 inserted into the tubular portion 68 from above, and the engagement portion 80 engages with an outer peripheral portion of the tubular portion 68.

With this configuration, since the engagement portion 80 engages with the outer peripheral portion of the tubular portion 68 extending upward from the upper face of the swing arm 13, it is easy to engage the engagement portion 80. Since the tubular portion 68 is a portion that is fixed to the swing arm 13 with the slider fastener 70, and it is unlikely to be shaken, it is possible to support the engagement portion 80 favorably.

The slider 60 includes a slider body portion 61 configured to receive the drive-power transmission member 39 and an inner extension portion 62 extending to a position on an inside of the drive-power transmission member 39 in a vehicle width direction, and the tubular portion 68 is provided at the inner extension portion 62.

With this configuration, the tubular portion 68 can be provided at a position away from the drive-power transmission member 39 inward in the vehicle width direction.

The swing arm 13 includes a pair of right and left arm portions 51, 52 and a cross member 53 connecting the right and left arm portions 51, 52 in a vehicle width direction, the slider 60 extends along an upper face of one of the arm portions 51 in a vehicle front-rear direction, and the tubular portion 68 is fixed to an upper face of the cross member 53.

With this configuration, the upper face of the cross member 53 can be utilized to fix the tubular portion 68 to a position on the inside of the arm portion 51 in the vehicle width direction.

The engagement portion 80 is a cut-in portion having an approximately U-like shape open in a front direction in top view, and an inner peripheral portion of the cut-in portion engages with a groove portion 68b of the outer peripheral portion of the tubular portion 68 from behind.

With this configuration, it is possible to engage the engagement portion 80 easily by inserting the engagement portion 80 into the groove portion 68b of the tubular portion 68 from behind. In addition, the position of the engagement portion 80 can be restricted in the front-rear direction, in the right-left direction, and in the up-down direction with a simple structure.

The cover member 40 includes an outer wall portion 76 that covers the drive-power transmission member 39 from an outside in a vehicle width direction, an inner wall portion 77 that covers the drive-power transmission member 39 from an inside in the vehicle width direction, and an extension portion 78 extending inward in the vehicle width direction from the inner wall portion 77, and the engagement portion 80 is provided in the extension portion 78.

With this configuration, since the engagement portion 80 can be separated from the drive-power transmission member 39 by the inner wall portion 77, it is possible to prevent or reduce contamination of the engagement portion 80 due to the drive-power transmission member 39 and thus possible to engage the engagement portion 80 appropriately. In addition, the engagement portion 80 can be hidden by the inner wall portion 77 so that the outer appearance can be made to look simple, and thus the outer appearance looks favorable.

The engagement portion 80 is provided at a front end portion of the cover member 40, and the engagement portion 80 is inserted into the slider 60 from behind.

With this configuration, it is possible to engage the engagement portion 80 with the slider 60 easily from behind.

The front fastening portion 76a and the engagement portion 80 are disposed to be aligned in a vehicle width direction at front end portions of the cover member 40.

With this configuration, since the front fastening portion 76a and the engagement portion 80 are aligned in the vehicle width direction, a positional deviation of the engagement portion 80 can be prevented or reduced by fastening, and the engagement portion 80 can be kept appropriately engaged with the slider 60.

The slider 60 with which the engagement portion 80 engages is made of an elastomer, and the engagement portion 80 is elastically supported by the slider 60.

With this configuration, since the cover member 40 is supported by utilizing the slider 60 made of an elastomer, it is possible to reduce vibration of the cover member 40.

Note that the above embodiment is for describing an aspect to which the present invention is applied, and thus, the present invention is not limited to the above embodiment.

Although the above embodiment has been described based on an example in which the power unit is the engine 11, the present invention is not limited to this example, but, for example, the power unit may be a motor unit of an electric saddle-ride type vehicle.

In addition, although in the above embodiment, the front fastening portion 76a and the engagement portion 80 are disposed to be aligned in the vehicle width direction at front end portions of the cover member 40, the present invention is not limited to this configuration, but only at least one of the fastening portions needs to be disposed to be aligned with the engagement portion 80 in the vehicle width direction.

Although the above embodiment has been described based on an example of the motorcycle 1, the present invention is not limited to this example, but the present invention is applicable to a three-wheeled vehicle with two front wheels or two rear wheels and a saddle-ride type vehicle with four or more wheels.

REFERENCE SIGNS LIST 1 motorcycle (saddle-ride type vehicle)
3 rear wheel
11 engine (power unit)
13 swing arm
39 drive-power transmission member
40 cover member
51 arm portion
52 arm portion
53 cross member
60 slider
61 slider body portion
62 inner extension portion
68 tubular portion
68b groove portion
70 slider fastener
76 outer wall portion
76a front fastening portion (fastening portion)
76b rear fastening portion (fastening portion)
77 inner wall portion
78 extension portion
79 fastener
80 engagement portion

The invention claimed is:

1. A saddle-ride type vehicle comprising: a swing arm swingable up and down; a rear wheel supported at a rear end portion of the swing arm; an endless drive-power transmission member extending along the swing arm in a front-rear direction and configured to transmit drive power of a power unit to the rear wheel; a cover member fixed to the swing arm and covering the drive-power transmission member; and a slider provided on an upper face of the swing arm and configured to receive the drive-power transmission member, wherein
the cover member includes a fastening portion that is fastened to the swing arm by a fastener and an engagement portion that engages with the slider,
the slider includes a tubular portion extending upward from the upper face of the swing arm and is fastened to the swing arm by a slider fastener inserted into the tubular portion from above,
the engagement portion engages with an outer peripheral portion of the tubular portion, and
the engagement portion is a cut-in portion having an approximately U-like shape open in a front direction in top view, and the slider fastener passes through the cut-in portion in an up-down direction.

2. The saddle-ride type vehicle according to claim 1, wherein
the engagement portion engages with the slider at a position on an inside of the drive-power transmission member in a vehicle width direction.

3. The saddle-ride type vehicle according to claim 1, wherein
the slider includes a slider body portion configured to receive the drive-power transmission member and an inner extension portion extending to a position on an inside of the drive-power transmission member in a vehicle width direction, and the tubular portion is provided at the inner extension portion.

4. The saddle-ride type vehicle according to claim 1, wherein
the swing arm includes a pair of right and left arm portions and a cross member connecting the right and left arm portions in a vehicle width direction,
the slider extends along an upper face of one of the arm portions in a vehicle front-rear direction, and
the tubular portion is fixed to an upper face of the cross member.

5. The saddle-ride type vehicle according to claim 1, wherein
an inner peripheral portion of the cut-in portion engages with a groove portion of the outer peripheral portion of the tubular portion from behind.

6. The saddle-ride type vehicle according to claim 1, wherein
the cover member includes an outer wall portion that covers the drive-power transmission member from an outside in a vehicle width direction, an inner wall portion that covers the drive-power transmission member from an inside in the vehicle width direction, and an extension portion extending inward in the vehicle width direction from the inner wall portion, and
the engagement portion is provided in the extension portion.

7. The saddle-ride type vehicle according to claim 1, wherein
the engagement portion is provided at a front end portion of the cover member, and the engagement portion is inserted into the slider from behind.

8. The saddle-ride type vehicle according to claim 1, wherein
at least one of a plurality of the fastening portions and the engagement portion are disposed to be aligned in a vehicle width direction at a front end portion of the cover member.

9. The saddle-ride type vehicle according to claim 1, wherein
the slider with which the engagement portion engages is made of an elastomer, and the engagement portion is elastically supported by the slider.

* * * * *